UNITED STATES PATENT OFFICE.

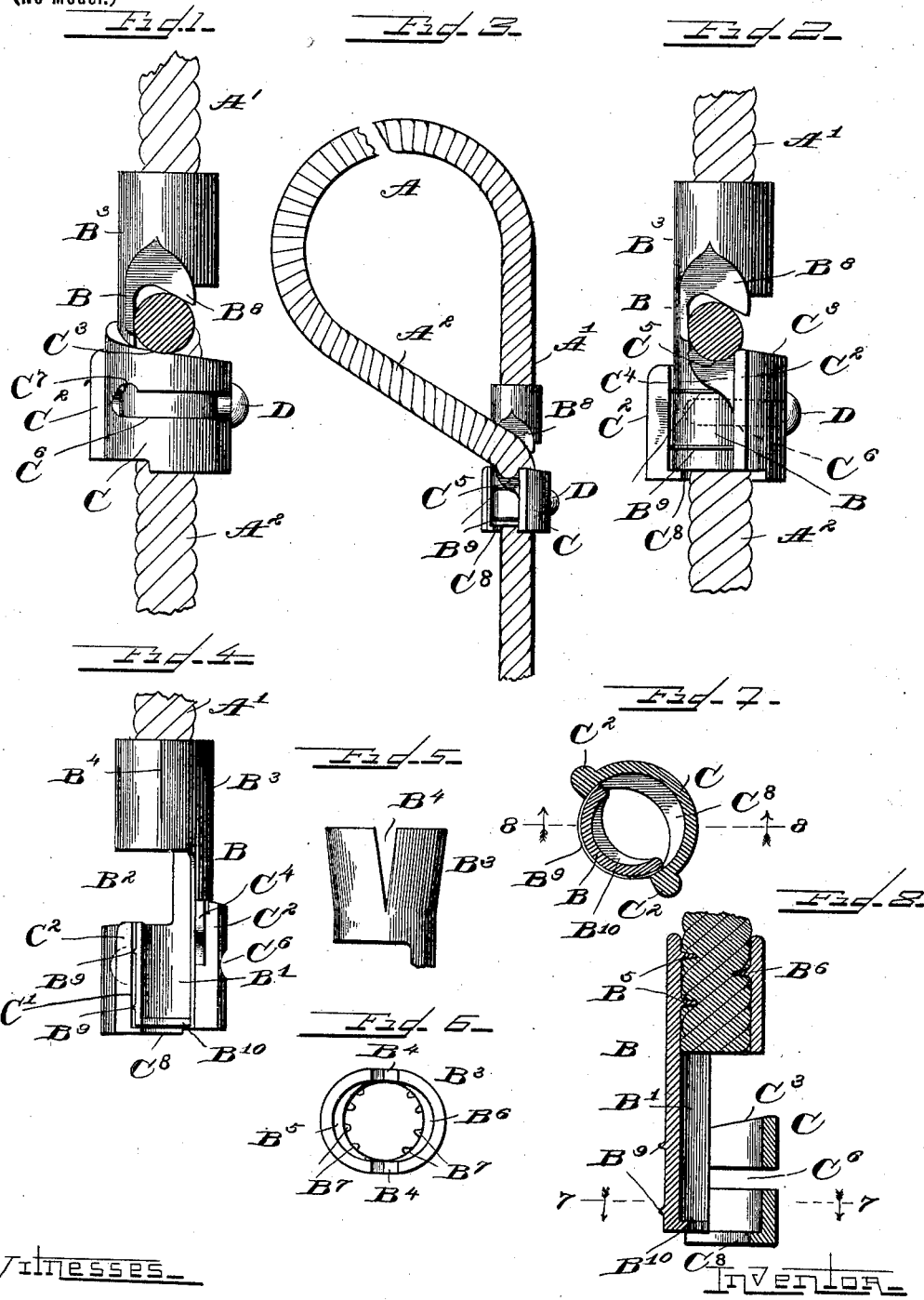

FREDERICK C. CROWE, OF CHICAGO, ILLINOIS, ASSIGNOR TO CROWE MANUFACTURING COMPANY, OF CHICAGO, ILLINOIS, A CORPORATION OF ILLINOIS.

ROPE-CLAMP.

SPECIFICATION forming part of Letters Patent No. 686,888, dated November 19, 1901.

Application filed December 29, 1900. Serial No. 41,481. (No model.)

*To all whom it may concern:*

Be it known that I, FREDERICK C. CROWE, a citizen of the United States, residing at Chicago, in the county of Cook and State of Illinois, have invented certain new and useful Improvements in Rope-Clamps, of which the following is a specification.

The object of this invention is the production of a device for securely gripping a rope. It is adapted to be used in rope halters, in suspending hammocks, and in many other connections.

In the accompanying drawings, Figure 1 is a side elevation of this improved rope-clamp in an open position, showing the free end of the loop laid in the clamp. Fig. 2 is a view of the rope-clamp in a closed position, showing the free end of the loop firmly held by the clamp. Fig. 3 is a view similar to Fig. 2, but upon a smaller scale, showing the position of the loop in the rope. Fig. 4 is a side view of the rope-clamp in an open position looking into the open side thereof. Fig. 5 is a detail view of the tubular shank of the clamp before it is bent down upon the end of the rope to hold the latter securely and permanently to the clamp. Fig. 6 is a view looking into the end of said shank, showing the crescent-shaped ribs for binding and the teeth on the said ribs for holding the rope in said tubular shank. Fig. 7 is a transverse sectional view taken on dotted line 7 7 of Fig. 8. Fig. 8 is a longitudinal central section on dotted line 8 8 of Fig. 7.

Like letters of reference indicate corresponding parts throughout the several views.

In the embodiment herein shown of this invention a device comprising two tubular members is secured at the end of a rope, and a portion of said rope (or of any rope) is laid into said members. One of these tubular members is considerably shorter than the other, but is large enough to surround the longer member. Both members are cut away at one side to permit the rope to be laid within them, and the outer member is rotatable with relation to the inner member, so that its said opening may be turned into coincidence with the similar opening of the inner member to admit or release the rope, or it may be turned away from said opening in the inner member to retain and clamp the rope.

A is a rope, of which A' is one end and A² a portion of the rope intermediate its ends.

B is the inner tubular member of the clamping device. It is cut away in the longitudinal opening B', which opening has the transverse extension B². Its shank end B³ is longitudinally split, as at B⁴, on opposite sides, and when formed is spread open, as shown in Fig. 5, to permit the insertion of the end of the rope to which it is to be secured. Within this tubular shank portion I provide the crescent-shaped ribs B⁵ and the similar rib B⁶, opposite to the ribs B⁵, which ribs are integral with the shank portion B³ and extend inward from the walls thereof. There are two of the ribs B⁵ and one B⁶, and all three are provided with teeth B⁷ for biting into and retaining the rope when the shank B³ is compressed upon the latter. A projection B⁸, formed integral with the member B, extends into the transverse extension B² of the opening B', formed therein. This projection is adapted to grip the portion A² of the rope, holding the latter firmly between the inclined side of the projection B⁸ and the end of the transverse extension B² of the opening B'. The rope A² to be clamped is laid into the tubular portion of the member B through the longitudinal opening B' in the side walls thereof and extends sidewise upward therefrom through the transverse extension B² of the opening B' in said tubular member B. The tubular member B is provided with two circumferential ribs B⁹ and with a gripping crescent-shaped cam B¹⁰, formed integral and set within the tubular portion at one end of the member.

C is a sleeve adapted to surround the tubular member B. This sleeve is cut away at its sides, forming the longitudinal opening C' therein, and said opening is provided at its edges with the ribs C², whereby said sleeve may be grasped and rotated upon the tubular member B. The longitudinal opening C' in said sleeve corresponds in size with and is adapted to be turned into coincidence with the longitudinal opening B' in the tubular member B. The inner end $C^3$ of the sleeve C is in cam form. The lower end of the cam coincides with and lies beside one edge of the transverse extension $B^2$ in the member B. The cam-surface $C^3$ rises slightly from said lower portion. At the upper portion of the cam-surface I have provided a projection $C^4$ from the sleeve C, formed integral with said sleeve and extending into the longitudinal opening $C'$ thereof. This projection is provided with the pocket $C^5$ for engaging and retaining the rope when the latter is clamped, preventing the accidental displacement of the sleeve C. A transversely-elongated opening $C^6$ is formed in the sleeve C, extending about one-half the distance around said sleeve, and a pocket $C^7$ is formed in the edge of the elongated opening $C^6$ for a purpose to be herein later described. This elongated opening $C^6$ is for the passage of the means, to be later described, for holding the sleeve in position upon the inner member B.

The sleeve C is provided with the crescent-shaped cam $C^8$, corresponding with the similar cam $B^{10}$ of the tubular member B. When the clamp is open for the insertion of the rope, the cams $B^{10}$ and $C^8$ lie side by side. When the rope is clamped in position, the cams $B^{10}$ and $C^8$ are opposed, holding the rope firmly between them.

A stud D (in this instance a screw) is secured in any suitable manner in the walls of the tubular member B. Said stud projects through the transversely-elongated opening $C^6$ in the sleeve C, and its head prevents displacement of said sleeve.

In using this rope-clamp the end of a rope is inserted into the tubular shank $B^3$ of the member B, said shank being formed as indicated in Fig. 5. By means of pressure or the blows of a hammer the shank $B^3$ is compressed upon said rope. The crescent-shaped ribs $B^5$, opposing the intermediate rib $B^6$, bind the rope between said ribs, and the teeth $B^7$ on said ribs indent the rope and hold it securely within the tubular shank portion $B^3$ of the member B. The body $A^2$ of the rope or of any rope to be clamped is placed in the transverse extension $B^2$ of the opening $B'$ behind the projection $B^8$ and is laid within the tubular portion of said member B. The sleeve C is then grasped by the hand of the operator and rotated with reference to the member B. The longitudinal opening $B'$ in the member B and the longitudinal opening $C'$ in the sleeve C are thereby thrown out of coincidence, and the rising cam-surface $C^3$ at the inner end of the sleeve C forces the rope extending through the transverse extension $B^2$ of the opening $B'$ into engagement with the end of said transverse opening and said projection $B^8$, which together form a wedge-shaped aperture adapted to bind the rope. When the sleeve is turned to the limit of the transversely-elongated opening $C^6$, the rope lies in the pocket $C^5$ of the sleeve C and is retained therein and the sleeve prevented from accidental displacement by the elasticity of the rope fibers. The stud D also lies in the pocket $C^7$ near one end of the transversely-elongated opening $C^6$ and also tends to prevent accidental displacement of said sleeve, the pressure of the rope tending to hold said sleeve outward against said screw. The turning of the sleeve C also turns the crescent-shaped cam $C^8$ thereof into opposition to the similar cam $B^{10}$ of the member B, thereby pinching the rope between said cams. To release the rope, the sleeve C is rotated in the contrary direction and its longitudinal opening $C'$ brought into coincidence with the longitudinal opening $B'$ of the member B. The rope is then free to be removed from the clamp.

Neither the cam-surface $C^3$ nor the crescent-shaped cams $B^{10}$ and $C^8$ are strictly necessary for holding the rope firmly in the clamp, as the frictional engagement between the rope and the tubular member B, where said rope makes a short "kink" in passing through the transverse extension $B^2$ of the opening $B'$, is sufficient to resist all ordinary strains upon the rope. To provide a wide margin of safety, however, I provide the said cam-surface $C^3$ and the crescent-shaped cams $B^{10}$ and $C^3$. It will be noticed that the effect of the latter (the crescent-shaped cams $B^{10}$ and $C^8$) is to make a short offset or kink in the rope, said cams not being in the same (transverse) plane each with the other.

I claim as my invention—

1. In a rope-clamp, in combination, a member having a tubular portion, which portion is provided with an opening in its walls; and a sleeve for surrounding the tubular portion of said member, said sleeve having an opening adapted to be turned into coincidence with the opening of said tubular portion.

2. In a rope-clamp, in combination, a member having a tubular portion, which portion is provided with a longitudinal opening in its walls; and a sleeve rotatably mounted with relation to said tubular portion, said sleeve having an opening adapted to be turned into coincidence with the longitudinal opening of said tubular portion.

3. In a rope-clamp, in combination, a member having a tubular portion, which portion is provided with an opening in its walls; a sleeve for surrounding the tubular portion of said member, said sleeve having an opening adapted to coincide with the opening of said tubular portion; and a cam formed on said sleeve, adapted to bind the rope against the walls of the opening in said tubular portion of said first-mentioned member.

4. In a rope-clamp, in combination, a member having a tubular portion, which portion is provided with a longitudinal opening in its walls; a sleeve for surrounding the tubular portion of said member, said sleeve having an opening adapted to coincide with the longitudinal opening in said tubular portion; and a cam formed on said sleeve, adapted to bind the rope against the walls of the opening in said tubular portion of said first-mentioned member.

5. In a rope-clamp, in combination, a member having a tubular portion, which portion is provided in its walls with a longitudinal opening having a transverse extension; a sleeve for surrounding the tubular portion of said member, said sleeve having an opening adapted to coincide with the longitudinal portion of said opening in said tubular portion; and a cam formed on said sleeve, adapted to bind the rope against the walls of the transverse portion of said opening in said tubular portion of said first-mentioned member.

6. In a rope-clamp, in combination, a member having a tubular portion, which portion is provided with an opening in its walls; a crescent-shaped cam on the interior of said tubular portion; a sleeve for surrounding the tubular portion of said member, said sleeve having an opening adapted to coincide with the opening in said tubular portion; a crescent-shaped cam on said sleeve, adapted to oppose the cam on the tubular portion; and a cam formed on said sleeve, adapted to bind the rope against the walls of the opening in said tubular portion of said first-mentioned member.

7. In a rope-clamp, in combination, a member having a tubular portion, which portion is provided in its walls with a longitudinal opening having a transverse extension; a crescent-shaped cam extending inward from the walls of said tubular portion; a sleeve for surrounding the tubular portion of said member, said sleeve having an opening adapted to coincide with the opening in said tubular portion; a cam projecting inward from the walls of said sleeve, which cam is adapted to oppose the crescent-shaped cam of the tubular portion; and a cam formed on said sleeve, adapted to bind the rope against the walls of the opening in said tubular portion of said first-mentioned member.

8. In a rope-clamp, in combination, a member having a shank adapted to inclose the end of a rope, and a tubular portion, which portion is provided in its walls with a longitudinal opening having a transverse extension; a projection extending into said transverse extension; a cam extending inward from the walls of said tubular portion; said sleeve having a longitudinal opening adapted to coincide with the longitudinal portion of the opening in said tubular portion; a cam extending inward from the walls of said sleeve, and adapted to oppose the cam of said tubular portion; and a cam formed on said sleeve, adapted to bind the rope against the walls of the opening in said tubular portion and the projection therein.

9. In a rope-clamp, in combination, a member having a tubular portion, which portion is provided in its walls with a longitudinal opening having a transverse extension; a projection in the transverse extension of said longitudinal opening; a sleeve having an opening adapted to coincide with the longitudinal portion of the opening in said tubular portion, said sleeve also having a transversely-elongated opening; a cam formed on said sleeve, adapted to bind the rope against the walls of the transverse extension of the opening in said tubular portion; and a stud fixed with relation to said tubular portion, extending through the transversely-elongated opening in said sleeve, for holding said sleeve in position relative to said tubular portion.

FREDERICK C. CROWE.

Witnesses:
GEO. A. MASTERS,
L. L. MILLER.